Feb. 10, 1970  A. O. PAYNE  3,494,209
PLANETARY ADJUSTING MECHANISM FOR VARIABLE SPEED DRIVE
Filed March 15, 1968  5 Sheets-Sheet 1

FIG. I

INVENTOR.
AMOS O. PAYNE.
BY
SETTLE, BATCHELDER & OLTMAN.
ATT'YS.

United States Patent Office 3,494,209
Patented Feb. 10, 1970

3,494,209
PLANETARY ADJUSTING MECHANISM FOR
VARIABLE SPEED DRIVE
Amos O. Payne, Eldrige, Iowa, assignor to J. I. Case
Company, Racine, Wis., a corporation of Wisconsin
Filed Mar. 15, 1968, Ser. No. 713,455
Int. Cl. F16h 55/52
U.S. Cl. 74—230.17                                    15 Claims

ABSTRACT OF THE DISCLOSURE

A variable speed drive mechanism including an expansible pulley having a fixed disc and a movable disc carried by a drive shaft with control means connected to the movable disc. The control means includes planetary gears interposed between the shaft and the movable disc with the gears being selectively actuated to move the movable disc in either axial direction on the shaft. The control mechanism is also capable of adjusting a second expansible pulley carried by a driven shaft by an amount equal to the adjustment of the drive pulley.

Background of the invention

The present invention relates generally to variable speed drive mechanisms and more particularly to an improved actuating mechanism for variable ratio belt drives.

In many work devices in which a driving shaft is connected to a driven shaft by some type of transmission means, it is necessary to change the relative speed of the two shafts while the driving shaft is driven at a constant speed. One type of variable speed drive which has been utilized is a so-called V-belt engaging sheaves on the respective shafts both of which are movable on the shafts to vary the effective diameter thereof thereby varying the speed of the shafts.

One exemplary use for this type of variable drive is utilized as the drive mechanism for driving the grain separating cylinder of a conventional combine. In such an environment, the variable speed drive must necessarily be capable of changing speed in a fast and efficient manner and preferably while the combine is in motion.

In recent times this has been accomplished by having both of the sheaves include an adjusting mechanism which is capable of varying the effective pitch diameter and is usually accomplished by making the respective sheaves of separate flanges or discs one of which is fixed to the shaft and the second movable axially of the shaft. One type of adjusting mechanism which has found considerable use in recent production of harvesting machines of the above type is to provide some type of positive adjusting mechanism for one of the sheaves and have the movable sheave half of the second sheave spring loaded. In this manner, when the positive adjusting mechanism is actuated to change the first sheave, the tension on the belt connecting the sheaves will automatically adjust the second sheave accordingly.

Another method of adjusting or changing the speed between two interconnected shafts is to utilize sheaves of the above type in which both movable flanges are selectively atcuated by a wedge member associated therewith with the respective wedges being synchronized so that increasing the effective diameter of one sheave will automatically decrease the effective diameter of the other.

While both types of mechanisms have found commercial success, there still remains a need for an inexpensive and more efficient control mechanism for varying the effective diameter of a variable speed drive.

Summary of the invention

The present invention provides an adjusting mechanism for a variable speed drive which includes a planetary gear means between the drive shaft and the movable disc of a pulley carried on the drive shaft. The planetary gear means normally rotate with the drive shaft and have brakes associated therewith to be selectively actuated to move the movable disc in opposite directions. The adjusting mechanism can be modified to include means for adjusting a driven pulley an equal and opposite amount.

Thus, the primary object of the present invention is to provide a control mechanism for a variable speed drive and in which all of the thrust loads are contained within the shifting mechanism.

Another object is to provide a control mechanism for a variable speed drive having an expansible pulley including a movable disc with planetary gear means interposed between the drive shaft carrying the pulley and the movable disc.

A further object is to provide a control mechanism of the above type which is remotely controlled through a simple control mechanism and which may be adapted for simultaneously varying the effective diameter of two associated pulleys.

Other objects of this invention will appear in the following description and appended claims reference being had to the accompanying drawings forming a part of this specification wherein like reference characters designate corresponding parts in the several views.

Figure 1:
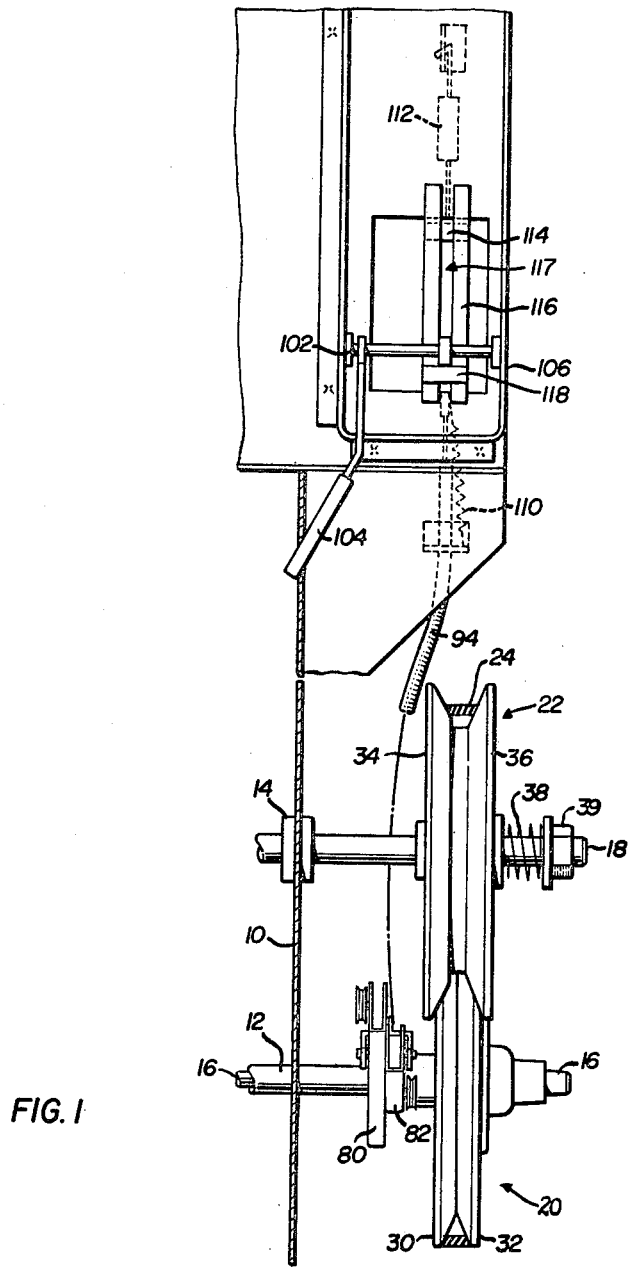
FIGURE 1 is a plan view of the control mechanism of the present invention shown in connection with various frame elements of a conventional harvesting machine.
Figure 2:
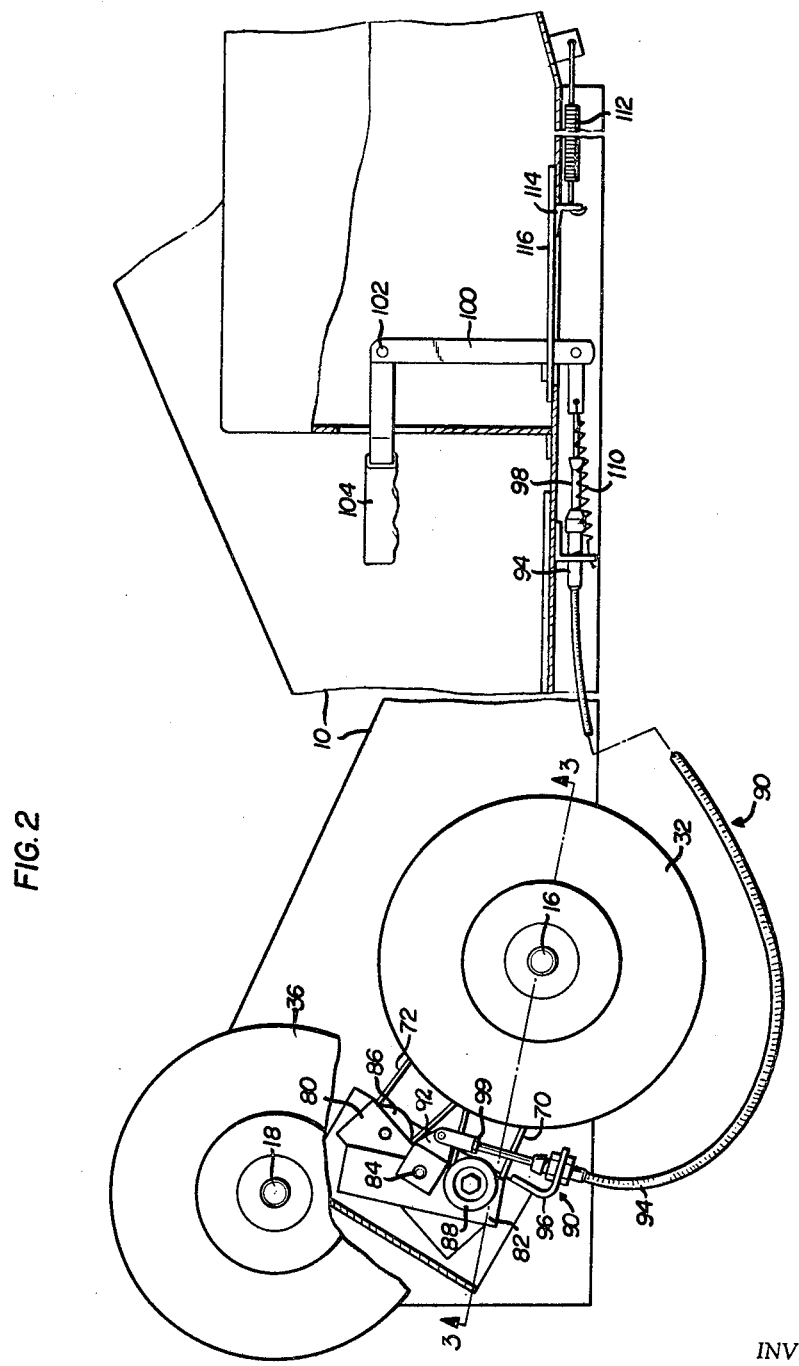
Figure 3:
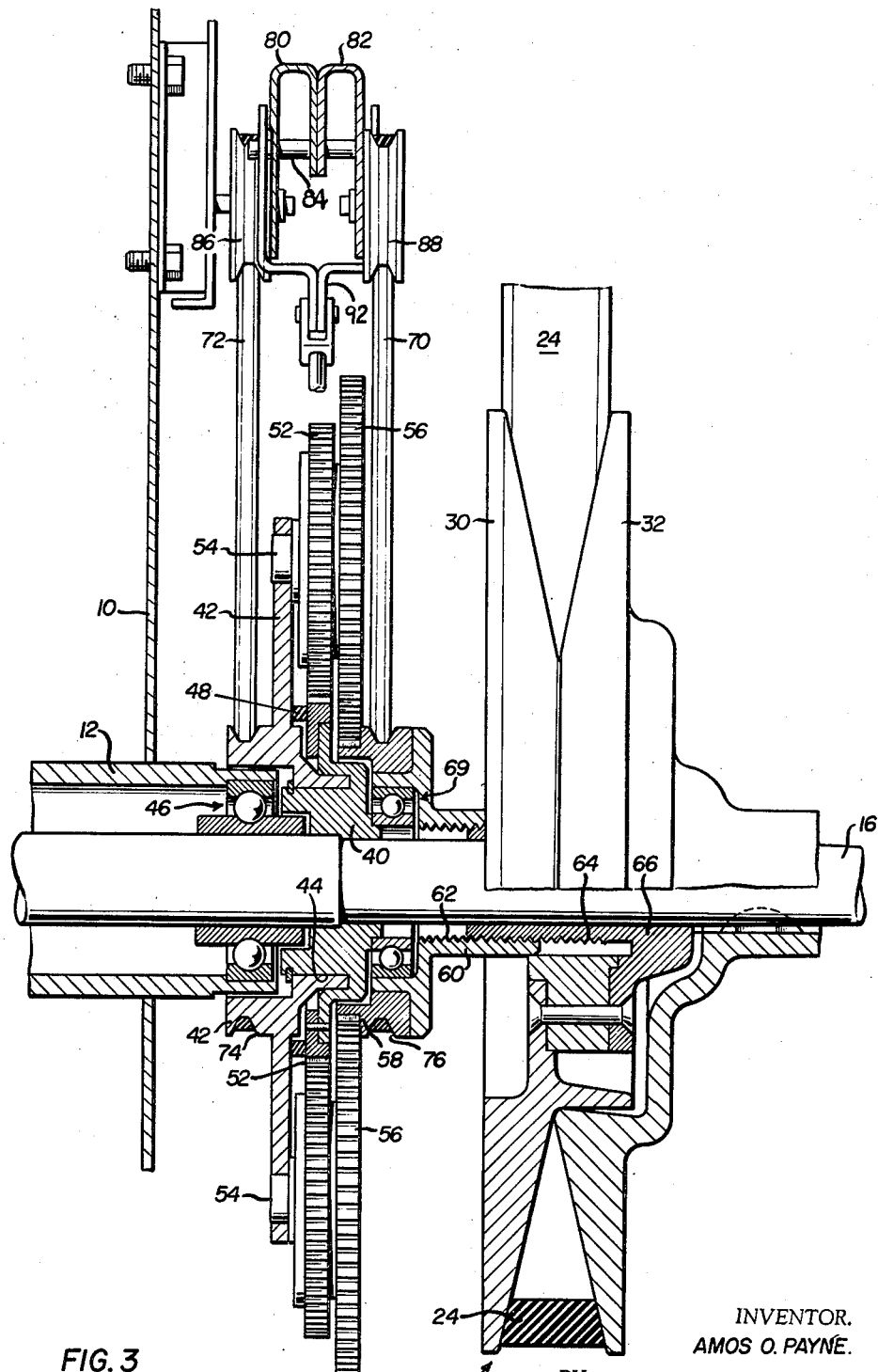
Figure 4:
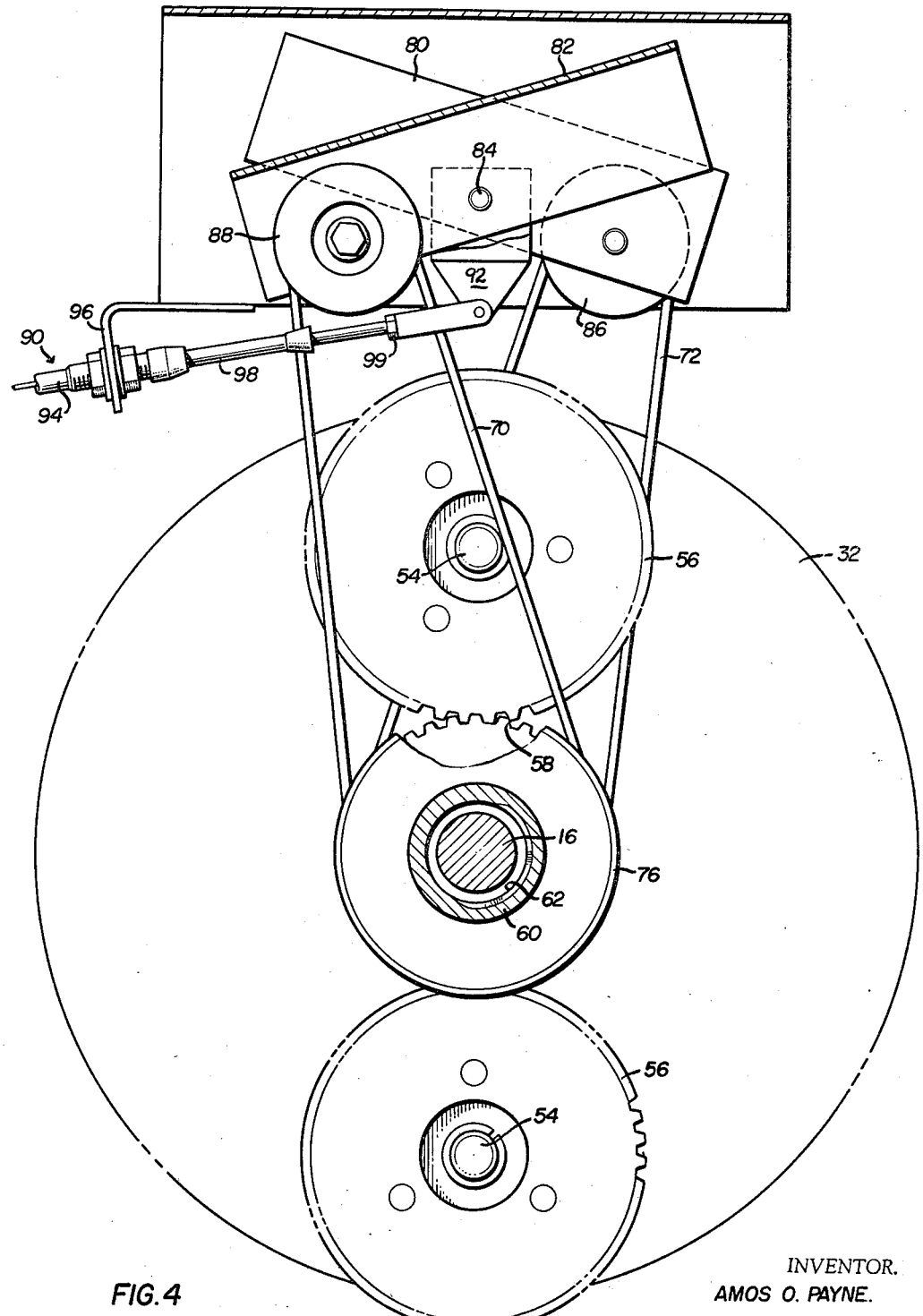
Figure 5:
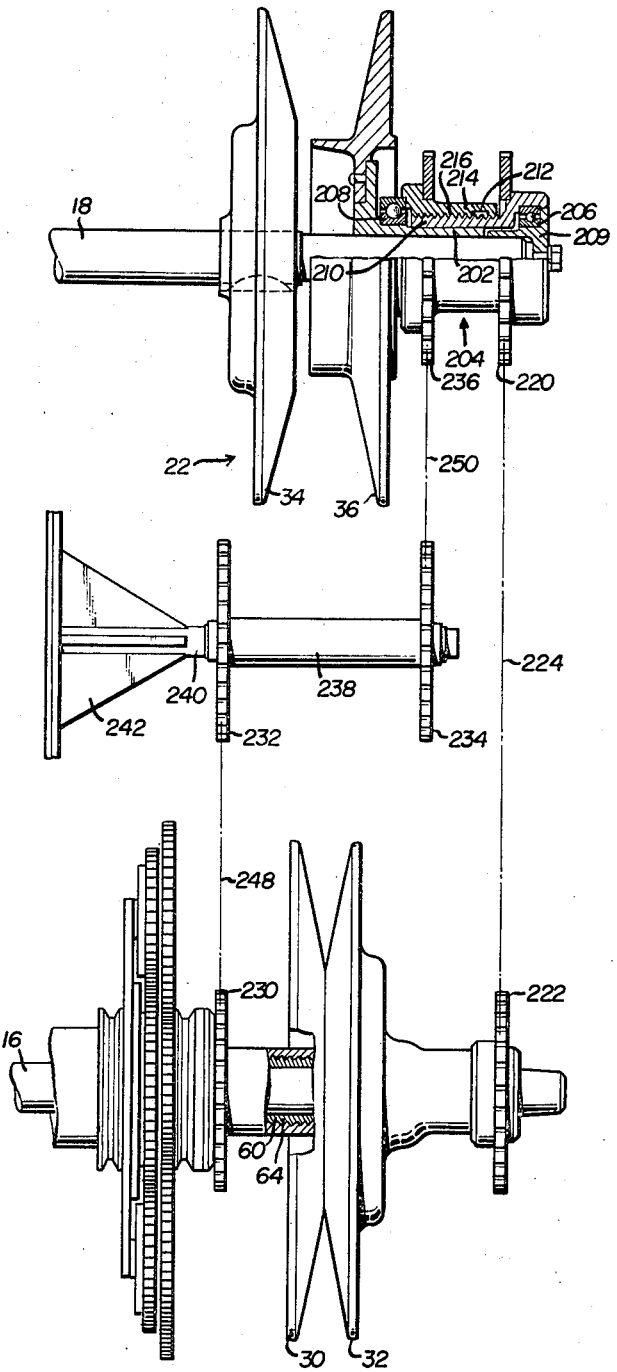

FIGURT 2 is a side elevational view of the mechanism shown in FIGURE 1;

FIGURE 3 is an enlarged sectional view taken generally along lines 3—3 of FIGURE 2;

FIGURE 4 is an enlarged side elevation view of the control mechanism shown in FIGURE 2; and FIGURE 5 is a sectional view similar to FIGURE 3 showing a slightly modified form of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Detailed description

The control device constituting a preferred form of the invention is shown in FIGURES 1 and 2 carried by a wall 10 which may represent a part of a combine or other harvesting machine having need of a variable speed drive. Carried on wall 10 in tubular members 12 and bearing 14 are spaced substantially parallel shafts 16 and 18. Each of the shafts have an expansible pulley 20 and 22 respectively supported thereon with a belt 24 encircling and interconnecting the respective pulleys. The shaft 16 will hereinafter be referred to as the drive shaft while the shaft 18 will be referred to as the driven shaft.

The driven shaft 18 may be connected to any suitable mechanism required to be driven at various speeds with respect to the drive shaft, such as for example the cylinder assembly of a conventional combine. The drive shaft having the expansible pulley 20 may be driven by any suitable power mechanism, such as the engine of a self-propelled combine.

The expansible pulley 20 includes a pair of relatively movable discs or flanges 30 and 32 with the flange 32 being fixedly secured to the shaft 16 while the remaining flange or disc 30 is movable axially in either direction on the shaft 16, as will become apparent hereinafter.

Likewise, the pulley or sheave 22 is variable to change the effective diameter by having a fixed disc or sheave 34 and an axially movable sheave or disc 36 carried on the shaft 18. In the embodiment illustrated in FIGURE 1, the discs or flanges 34 and 36 are moved relative to each other through the forces of a spring 38 interposed between a nut 39 and the outer surface of the movable disc 36.

According to the primary aspect of the present invention, the control mechanism for shifting the axially movable disc 30 with respect to the shaft 16 includes planetary gear means interposed between the drive shaft 16 and the movable disc 30. The planetary gear means are selectively actuatable so as to shift the movable disc or flange in either direction upon the drive shaft 16. All of the operable elements of the control mechanism are carried by the drive shaft so that accurate alignment of the various elements due to torsional effects on the frame as well as any other extraneous effects are eliminated. In the embodiment illustrated in FIGURES 1 through 4, the control mechanism is illustratively shown as including a first or sun gear 40 fixedly secured (keyed) to the drive shaft to be rotatable therewith.

Sun gear 40 is keyed to and always rotates with drive shaft 16 which in turn is rotatably supported within tubular member 12 by bearing 46. A planetary cage or carrier 42 is supported on outer bearing surface 44 of sun gear. Normally these two elements rotate together but relative rotation occurs under special conditions, as will be described hereinafter. Planet gears 52 and 56 are keyed together and are rotatable on pins 54 which form part of carrier 42. Planet gears are in constant mesh with follower gear or second sun gear 58 formed integral with a hub or hollow shaft 60 which surrounds the drive shaft 16. The hub or tubular member 60 has an internally threaded portion 62 which cooperates with a corresponding threaded portion 64 on the peripheral surface of a hub 66 integral with the movable flange 30. In order to cause the movable disc 30 to rotate with the shaft 16, the hub or extension 66 is keyed to the drive shaft 16 so as to be fixed for rotation therewith but be capable of axial movement with respect thereto. A bearing 69 is interposed between the hollow shaft 60 so that the gear 58 and hollow coaxial shaft 60 can be rotated with respect to the shaft 16, for a purpose which will become apparent hereinafter.

Thus, the interconnection between the drive shaft 16, the first gear 40 and the hollow shaft will allow a relative rotational movement between the hollow shaft and the shaft 16 while maintaining a fixed axial relation between these elements. In normal operation, the frictional forces between the threaded portion 62 and 64 as well as the forces between the respective gears should normally cause the planetary carrier and the respective gears to rotate as a single unit with the drive shaft 16. This will maintain a fixed relationship between the hollow shaft 60 and the hub 66 to thereby maintain a fixed relation between the discs or flanges 30 and 32 of pulley or sheave 20. However, it is preferred to provide positive friction means in the form of a friction pad 48 or equivalent device such as a detent between the sun gear 40 and carrier 42. This will insure that the carrier 42 will rotate as a unit with the drive shaft 16.

However, if it is desired to increase or decrease the effective speed of the driven shaft 18 with respect to the drive shaft 16 it is necessary to axially move the disc 30 thereby varying the effective diameter of the entire pulley mechanism 20.

According to the invention, this is accomplished by actuating a brake mechanism (to be described hereinafter) to vary the effective rotational movement between the hollow shaft 60 and the drive shaft 16. Thus, by way of example, if the planetary carrier 42 is stopped or braked and the drive shaft 16 continues to rotate, the sun gear 40 will rotate the planet gears 52 and 56 on the pins 54 to thereby increase the effective rotational speed of the hollow shaft or member 60 with respect to the shaft 16. This will increase the effective rotational speed of the hollow shaft 60 with respect to the hub 66 and will shift the movable disc 30 leftwardly, as viewed in FIGURE 4, thereby decreasing the effective diameter of the drive pulley 20. Of course, if it is desired to increase the effective diameter of the drive pulley, it is only necessary to stop the rotational movement of the hollow shaft or member 60 and the decrease in relative speed between the hollow shaft 60 and the drive shaft 16 will shift the movable disc 30, right-wardly as viewed in FIGURE 3, thereby increasing the effective diameter.

The brake means is illustratively shown in FIGURES 2 through 4 as including a pair of brake bands 72 and 70 respectively associated with the planetary carrier 42 and the hollow shaft 60. Thus, the planetary cage has a recessed portion 74 for receiving a portion of the brake band 72 while the hollow shaft 60 or gear 58 likewise has a recessed portion 76 receiving the brake band 70.

The brake means further includes selectively operable actuating means in the form of pivoted members 80 and 82 carried on a pin 84 suitably supported on the housing 10. The pivoted members 80 and 82 respectively have brake members 86 and 88 fixedly secured thereto which are associated with the respective brake bands 72 and 70. Thus, by selectively pivoting the respective members or links 80 and 82 on the pin 84, the member 60 or the planetary carrier 42 may be stopped or at least the rotational movement thereof be decreased with respect to the drive shaft 16 to provide for the necessary axial movement of the movable flange 30 through the threaded portion 62, 64.

According to another aspect of the invention, the means for selectively moving the respective pivoted links 80 and 82 is located for remote control, preferably in the operator's compartment of the vehicle, such as a combine. In the illustrated embodiment, this is accomplished through a flexible connection such as a Bowden wire 90 having one end thereof located adjacent the operator's compartment of the vehicle with the opposite end being suitably connected to an actuating member 92, as will be presently described.

The Bowden wire or flexible cable has a sheath portion 94, one end of which is fixedly secured through a bracket 96 to the support portion for the pivot pin 84. The cable 98 of the Bowden wire is interconnected with the actuating member 92, preferably through an adjustable connection 99 of a conventional type. The brake member 92 is configured so as to be engageable with both of the pivoted members or legs 80 and 82 and in an intermediate position (shown in FIGURE 4) neither of the brake bands 70 and 72 are actuated.

The opposite end of the cable assembly 90 again has the sheath 94 fixedly secured to the housing 10 of the vehicle. The cable 98 has its free end extending beyond the housing 94 and connected to one end of a link 100 which in turn is secured at its opposite end to a pivoted shaft 102. The pivoted shaft 102 has an operator's lever 104 fixedly secured thereto and is mounted for rotation on a bracket portion 106 formed in the operator's compartment of the vehicle.

The manual actuating mechanism further includes means for maintaining the cable 98 as well as the brake member 92 in a neutral position. For this purpose, a pair of springs 110 and 112 are operatively connected to the free end of link 100. The spring 110 has one end connected directly thereto while the opposite end is connected to the housing portion of the operator's compartment of the vehicle.

The second or centralizing spring 112 is connected to a bracket or stop 114 secured to a cage 116 surrounding the link 100 and slidable on the floor of the operator's compartment. The cage 116 has an elongated slot 117 which allows realtive movement between cage 116 and link 100.

The forces of springs 110 and 112 are selected to maintain the link 100 in the position shown in FIGURE 2 when no manual force is applied to lever 104. Thus, the force of spring 112 is sufficient to normally maintain the stop 114 in engagement with an edge of the opening in the cab floor as shown in FIGURE 2. The second or return spring is weaker than the centralizing spring 110 but is strong enough to return the link 100 and lever 104 from a counterclockwise rotated positon to the position shown in FIGURE 2 whenever the lever 104 is released. In this position the link 100 is in engagement with a stop 118 defined by the cage 116 (FIGURE 1).

In this manner the springs 110 and 112 will automatically disengage either of the brake bands 70 and 72 by centering the links 80 and 82 whenever the control lever is released from either of the engaged positions.

Operation

It is believed that the operation of the control mechanism is apparent from the above description. Thus, in normal operation, the entire planetary gear means is rotated with the shaft 16 as well as the axially movable disc 30 and the fixed disc 32. However, if it is desired to decrease the effective diameter of the expandable pulley 20 thereby decreasing the speed of the driven shaft 18 with respect to the constant speed of the drive shaft 16, it is only necessary to push the control lever downwardly from its neutral position which will force the actuating member 92 to be rotated clockwise about pivot pin 84 thereby pivoting the link 82 clockwise on the same pin 84 to engage the brakeband 70 with the recess 76. This will decrease the relative speed of the hollow shaft 60 with respect to the drive shaft 16 and hub 66 thereby moving the flange 30 axially leftwardly as viewed in FIGURE 3. Of course, release of the control lever will allow the spring 110 to again move the control lever as well as the associated control cable 98 and various other parts to the neutral position to automatically allow the brake band 70 to be released.

Of course, moving the control lever upwardly from its neutral position will cause the brakeband 72 to stop the rotation of the planetary carrier thereby increasing the speed of the hollow shaft and second sun gear with respect to the drive shaft 16 and hub 66 to move the movable disc 30 axially rightwardly as viewed in FIGURE 3. The increase and decrease in the effective diameter of the expansible pulley 20 will automatically cause the driven pulley 22 to be changed since the tension force on the belt is balanced by the force of spring 38 and will either be increased or decreased dependent upon the change being made and this change will allow the spring 38 to change the effective diameter of the second pulley a corresponding amount. However, it should be noted that an increase in effective diameter of the first pulley 22 will decrease the effective diameter of the second pulley and vice versa and the changes are produced by moving the respective flanges 30 and 36 in opposite axial directions by an equal amount. This feature is of extreme importance when considering the fact that the center of the belt interconnecting the two pulleys will be moved axially with respect to the respective shafts and by having the respective pulleys increased and decreased in opposite directions, the centerline of the belt will remain in a constant alignment.

Of course, it can readily be appreciated that all of the movable elements of the control mechanism necessary for changing the effective diameter are carried by the drive shaft 16 and are normally rotated therewith. This is of importance when considering such a control mechanism is normally associated with a large machine traveling over rough ground. This has heretofore caused considerable difficulty since the distortion or waving of the frame elements of the machine, which normally had the speed control devices connected thereto, would cause a change in the speed control mechanism.

Modified embodiment

A slightly modified embodiment of the invention is disclosed in FIGURE 5. This embodiment is very effective in changing the relative speeds between a drive shaft and a driven shaft and in which it is necessary to be able to transfer all of the power delivered by the drive shaft to the driven shaft. Thus, while the embodiment described hereinabove has been found to be very effective in most instances, the full power of the drive shaft cannot be effectively transmitted to the driven shaft. This is necessarily true since the change in effective diameter of the expansible pulley carried by the driven shaft must take place through the tension of the belt.

In the modified embodiment of the invention shown in FIGURE 5, both of the movable discs carried by the respective shafts are positively driven whenever a change in effective speed between the two shafts is desired. In this embodiment, the spring biased control mechanism for the second movable disc carried by the driven shaft is replaced by a drive mechanism connected with the drive shaft as well as the control means for the first movable disc 30. Since all of the elements of the control mechanism associated with the movable disc 30 are identical to those disclosed in FIGURES 1 through 4 embodiment, like reference numerals have been utilized in the embodiment illustrated in FIGURE 5.

The positive control mechanism for the movable disc 36 includes a hub portion 202 keyed to shaft 18 to be rotatable therewith but capable of being moved axially in either direction. The hub portion 202 is integral with the disc 36 and rotatably supports the positive drive mechanism 204, now to be described. The positive drive mechanism is rotatably supported by spaced bearings 206 and 208 respectively supported through bushing 209 and hub 202 carried by the shaft 18. The drive mechanism 204 includes a tubular member or shaft 210 externally threaded at 212 and rotatably supported on the hub portion 202 carried by the disc 36 and bearing 206. A second tubular member or hub 214 is supported by bearing 208 and is internally threaded at 216 with the threads 212 and 216 cooperating with each other.

The tubular member or hollow shaft 210 is adapted to be driven at the same speed as the drive shaft 16. For this purpose, a positive drive is interposed between the shaft 16 and the tubular portion 210. In the illustrated embodiment, the positive drive includes sprockets 220 and 222 respectively secured to the tubular member 210 and the drive shaft 16 with a chain 224 journalled on the sprockets. Therefore, the tubular portion 210 is normally driven at the same speed as the drive shaft 16 and the hollow shaft or member 210 thereof is at all times rotated at the same speed as the drive shaft 16.

Additional drive means are interposed between the hollow shaft 60 associated with the control mechanism connected to the movable disc 30 and the hub portion 214 associated with the movable disc 36. In the illustrated embodiment, this drive means includes sprockets 230, 232, 234 and 236. The sprockets 232 and 234 are interconnected by a tubular shaft 238 and rotatably journalled on a shaft 240 carried on a bracket 242 supported on the housing 10 of the machine.

The sprocket 230 is identical in size to the sprocket 232 and is fixedly secured to the hollow shaft 60 and gear 58 with a drive chain 248 interconnecting the respective sprockets. Likewise, the sprocket 234 is identical in size to the sprocket 236 and interconnected by a chain 250.

From the above description, it is readily apparent that the hub or tubular member 214 is at all times driven at the same speed as the hollow shaft 60 and gear 58 while the tubular member or hollow shaft 210 is at all times driven at the same speed as the drive shaft 16. Normally these two speeds are identical, that is when there is no change of effective pulley diameter being made. However, if the movable disc 30 carried by the drive shaft 16 is moved in one direction as by decreasing the relative rotational speed between the hollow shaft 60 and the drive shaft 16, this relative change in rotational speed will likewise be affected between the members 210 and 214 through the positive drive including the chains 224, 248 and 250. Thus, it can be appreciated that an increase in effective diameter of the expansible pulley will automatically cause a decrease in effective size by a like amount of the expansible pulley 22. Again the respective movable discs of the two pulleys are moved in opposite directions an equal amount so that the center line of the belt while moving axially with respect to the shafts 16 and 18, will remain in alignment.

As was indicated above, the modified embodiment of the present invention is readily adaptable to any variable speed drive mechanism wherein all of the power supplied to the drive shaft must be utilized in driving the driven shaft. The positive drive between the two control members for the respective expansible pulleys carried by the two shafts allows for an increase or decrease in the effective speed between the two shafts without any spring biasing mechanism.

While one exemplary embodiment of the invention has been described in detail, it will be apparent to those skilled in the art that the disclosed embodiments may be modified.

I claim:

1. In a variable speed drive mechanism having a shaft, an expandable pulley on said shaft including a fixed disc and axially movable disc non-rotatably carried by said shaft, and control means for shifting said movable disc on said shaft, the improvement of said control means comprising planetary gear means interposed between said shaft and said movable disc for shifting said disc, the planetary gear means having an inter-engaging connection with said movable disc so that relative rotation therebetween will cause corresponding relative axial movement, and brake means selectively actuating said planetary gear means to shift said movable disc in either direction to vary the effective diameter of said pulley.

2. A variable speed drive as defined in claim 1, in which said planetary gear means includes a first sun gear fixed to said shaft, a second sun gear connected by the inter-engaging connection with said movable disc, and the brake means includes a pair of brake bands operatively connected with said planetary gear means for selectively increasing and decreasing the relative rotative speed between said sun gears for axially moving said movable disc.

3. A variable speed drive as defined in claim 2, in which said planetary gear means also includes a carrier rotatably supported on said shaft wtih planet gears respectively in mesh with each of said sun gears and the pair of brake bands are operatively respectively connected to said second sun gear and said carrier and selectively actuatable for moving said movable disc in opposite directions on said shaft.

4. A variable speed drive mechanism having a drive shaft, a sheave non-rotatably supported on said shaft and including a fixed disc and an axially movable disc, shaft and control means for shifting said movable disc, said control means comprising a shaft co-axial with said drive shaft and having a driving connection with said movable disc whereby relative rotational movement therebetween will cause corresponding relative axial movement therebetween, first and second gear elements respectively secured to the drive and co-axial shafts, a planetary carrier element having planet gears respectively engaging the first and second gear elements, and brake means selectively actuatable to brake one or the other of the elements so as to increase and decrease the relative speed of said shafts whereby said driving connection moves said movable disc axially on said shaft.

5. A variable speed drive as defined in claim 4 in which said driving connection includes inter-engaging cooperating threads on said shaft and hub.

6. A variable speed drive as defined in claim 4 in which said brake means includes a pair of bands respectively engageable with the elements to be braked and actuating means operable to selectively urge one or the other of the bands into braking engagement with a respective one of the elements.

7. A variable speed drive as defined in claim 4, and wherein said drive shaft is operatively connected to a spaced parallel driven shaft by a belt encircling said sheave and a pulley non-rotatably supported on the driven shaft and wherein said pulley includes a first flange fixed on said driven shaft and a second flange axially movable on said driven shaft, the further improvement of second control means for axially shifting said second flange comprising a rotatable member carried by said driven shaft, a shifting mechanism operatively interposed between said rotatable member and said second flange, means defining a driving connection between said rotatable member and said drive shaft and means defining a driving connection between said hollow shaft and said shiftig mechanism whereby axial movement in one direction of said movable disc will cause an equal axial movement in the opposite direction of said second flange.

8. A control mechanism for varying the speed of a driven shaft with respect to a driving shaft and wherein said driving shaft includes a pulley having a fixed flange and an axially movable flange with said control mechanism interposed between said movable flange and said driving shaft, and said driven shaft includes a sheave with a belt encircling said pulley and sheave, said control mechanism comprising a sun gear fixed to said driving shaft for rotation therewith, a planetary carrier normally rotating with said driving shaft and having planet gears in mesh with said sun gear, a member normally rotating with said shaft and operatively connected to said movable flange and said planet gears, and brake means selectively engaging said carrier and said member for selectively decreasing the relative speed of said member and said carrier thereby axially shifting said movable flange in opposite directions to change the speed of said driven shaft with respect to said driving shaft.

9. A control mechanism as defined in claim 8, wherein said sheave includes a first fixed flange and an axially movable second flange carried by said driven shaft, the further improvement of means for axially shifting said second flange in response to axial shifting of said movable flange, said last means comprising a hollow shaft rotatable on said driven shaft, drive means interposed between said hollow shaft and said second flange, means for rotating said hollow shaft at a speed corresponding to the speed of said drive shaft and means for rotating said drive means at a speed corresponding to the speed of said member.

10. A control mechanism as defined in claim 9, in which said last two means respectively comprise a chain and sprocket connection between said hollow shaft and said drive shaft and a chain and sprocket connection between said drive means and said member.

11. In a variable speed drive of the type including driving and driven spaced parallel rotatable shafts, a sheave on each of said shafts and each comprising a first belt engaging flange fixed on the shaft and a second belt engaging flange slidably but non-rotatably supported on the shaft, a belt disposed about said sheaves in engagement with said flanges, and control means connected to each of said second belt engaging flanges for shifting said flanges axially to vary the effective diameter of the respective sheaves, the improvement of one of said control means comprising a first gear secured to said drive shaft, drive means including a second gear operatively interposed between said first gear and said second belt engaging flange carried by said drive shaft and means producing relative rotational movement between said first and second gears for selectively actuating said drive means to shift said second belt engaging flange in either direction axially of said drive shaft.

12. A variable speed drive as defined in claim 11, in which said drive means further includes a carrier having planet gears respectively in mesh with said first and second gears and said last means includes brake means operatively connected to said carrier and said second gear and selectively actuatable to increase and decrease the speed of said second gear with respect to said first gears.

13. A variable speed drive as defined in claim 12, further including friction means interposed between said carrier and said driving shaft normally causing said carrier to rotate with said driving shaft, said friction means becoming ineffective when said brake means connected to said carrier is actuated.

14. A variable speed drive as defined in claim 11, the further improvement of the other of said control means comprising a member rotatable on said driven shaft, means for rotating said member at the speed of said drive shaft, a drive mechanism interposed between said member and said second belt engaging flange on said driven shaft, and means for rotating said drive mechanism at the speed of rotation of said second gear whereby a change in effective diameter of said drive sheave will result in an equal and opposite change in effective diameter of said driven sheave.

15. A variable speed drive as defined in claim 14, in which said last two means respectively comprise a positive driving connection between said member and said drive shaft and a positive driving connection between said drive mechanism and said second gear.

References Cited

UNITED STATES PATENTS 2,889,716  6/1959  Doty _____ 74—230.17 XR
3,250,141  5/1966  Luenberger _____ 74—230.17

FOREIGN PATENTS 373,679  6/1932  Great Britain.

JAMES A. WONG, Primary Examiner